United States Patent
Yeager et al.

(10) Patent No.: US 6,735,770 B1
(45) Date of Patent: *May 11, 2004

(54) METHOD AND APPARATUS FOR HIGH PERFORMANCE ACCESS TO DATA IN A MESSAGE STORE

(75) Inventors: William J. Yeager, Menlo Park, CA (US); Frederic C. Batty, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/067,497

(22) Filed: Apr. 27, 1998

(51) Int. Cl.$^7$ .............................................. G06F 9/00
(52) U.S. Cl. ..................................................... 718/107
(58) Field of Search ................................ 709/318, 213, 709/227, 312, 300; 718/107, 102; 719/318, 310, 312; 714/38

(56) References Cited

U.S. PATENT DOCUMENTS

| | | | |
|---|---|---|---|
| 5,305,455 A | * 4/1994 | Anschuetz et al. | 709/100 |
| 5,355,488 A | 10/1994 | Cox et al. | |
| 5,689,566 A | * 11/1997 | Nguyen | 380/25 |
| 5,956,489 A | * 9/1999 | San Andres et al. | 395/200.51 |
| 5,991,845 A | * 11/1999 | Bohannon et al. | 710/200 |
| 6,070,184 A | * 5/2000 | Blount et al. | 709/200 |
| 6,085,247 A | * 7/2000 | Parsons, Jr. et al. | 709/227 |
| 6,167,402 A | * 12/2000 | Yeager | 707/10 |
| 6,167,423 A | * 12/2000 | Chopra et al. | 709/100 |
| 6,418,542 B1 | * 7/2002 | Yeager | 714/38 |
| 6,457,064 B1 | * 9/2002 | Huff et al. | 709/318 |

FOREIGN PATENT DOCUMENTS

EP     0 817 047 A2     1/1998

OTHER PUBLICATIONS

Cluster, "Inside Window NT," Microsoft Press, pp. 83–97, Dec. 1993.*

Innosoft International: "PMDF System Manager's Guide—Chapter 11" PMDF Documentation, 'Onfine!' No. PMD-F–REF–5.1, Aug. 1997, pp. 1–17, XP002187544, retrieved from the Internet: URL:http://ruls01.fsw.LeidenUniv.nl/{Versteegen/pmdf/DOC/HTML/sysman/book_b.html, Retrieved on Jan. 16, 2002.

Lawrence, K.: *Writing Multithreaded Graphics Programs, The Developer Connection News*, vol. 7, Apr. 1995, pp. 16–17, XP002188186.

(List continued on next page.)

*Primary Examiner*—Sue Lao
(74) *Attorney, Agent, or Firm*—Beyer Weaver & Thomas LLP

(57) ABSTRACT

A method and apparatus are disclosed for accessing messages in a message store in a multi-threaded system with reduced contention by first determining whether a process is available for accepting a new connection and responsibility for that connection is transferred to that process, which includes one or more threads. One thread is selected and initialized which then manages client requests for accessing messages or data in the message store. The thread is terminated when a termination request is received or when a predetermined condition has been met. Also provided is a computer system for accessing messages in a message store in a multi-threaded environment with reduced contention. Clients are connected to a connection request router that contains a parent process for routing client requests for manipulating data. Also included are request handlers associated with the request router where the request handlers include a multiplicity of active connection threads. A shared memory area associated with the request router contains request handler identifiers, thread identifiers, and other activity information that can be shared by the request handlers and their associated request router.

24 Claims, 10 Drawing Sheets

OTHER PUBLICATIONS

Kleiman, S., et al.: *Writing Multithreaded Code In Solaris, Intellectual Leverage.* San Francisco, Feb. 24–28, 1992, Proceedings of the Computer Society International Conference (COMPCON) Spring, Los Alamitos, IEEE Comp. Soc. Press, US, vol. Conf. 37, (Feb. 24, 1992), pp. 187–192. XP010027136.

Evans, S.: *The Notifier*, USENIX Association Summer Conference Proceedings, Atlanta 1986, Jun. 9–13, 1986, pp. 344–354, XP002188187, El Cerrito, Calif. USA, USENIX Assoc., USA.

*Event–Raising Mechanism for Networking Architecture*, IBM Technical Disclosure Bulletin, IBM Corp., New York, US, vol. 39, No. 1, 1996, pp. 381–384, XP000556437, ISSN: 0018–8689.

Crispin, M., "Internet Message Access Protocol," *University of Washington*, (1996), pp. 1–93.

\* cited by examiner

METHOD AND APPARATUS FOR HIGH PERFORMANCE ACCESS TO DATA IN A MESSAGE STORE

This application is related to U.S. Pat. No. 6,167,402, issued Dec. 26, 2000, filed on the same date herewith and commonly assigned, entitled "HIGH PERFORMANCE MESSAGE STORE," U.S. application Ser. No. 09/067,546, filed on the same date herewith and commonly assigned, entitled "METHOD AND APPARATUS FOR DETECTING INPUT DIRECTED TO A THREAD IN A MULTI-THREADED PROCESS," U.S. application Ser. No. 09/067, 547, filed on the same date herewith and commonly assigned, entitled "CRITICAL SIGNAL THREAD," which are incorporated herein by reference.

BACKGROUND OF THE INVENTION

1. Field of the Invention

The present invention relates generally to the field of computer software and client-server applications. In particular, it relates to methods of accessing data in a distributed computing environment.

2. Discussion of Related Art

The accelerated growth of network computing in the 1990s has been accompanied by an increasingly prevalent form of communication most commonly referred to as e-mail. As more individuals, whether at home, in corporations, small businesses, academic institutions, or government organizations, have access to computers connected to some type of computer network, electronic mail is quickly becoming (and in many settings already is) a preferred mode of communication. People find e-mail an efficient and effective way to communicate whether they are sending a simple one-time message or carrying on a long-term discussion or conversation.

While e-mail has been used for years within large organizations such as corporations and universities for sending messages within the organization's internal networks and is typically based on proprietary formats and protocols, the Internet is bringing e-mail out of the realm of large enterprises and into the mainstream. Since the Internet is a publicly accessible, global, computer network, it is increasingly being used for its e-mail capability. In addition, TCP/IP ("transmission control protocol/internet protocol), the Internet's communication layers are being used to develop computer networks within private entities known as intranets based on TCP/IP instead of proprietary formats and protocols. This approach allows, for example, a corporation or university to have an internal computer network that is compatible with the Internet and has all the features of the Internet, including Web sites, the ability to hyperlink, and, of course, send and receive e-mail.

With regard to the e-mail, the explosive growth of the Internet and the growing attraction of intranets has led to a proliferation of e-mail messages. Typically, e-mail messages are received and stored on network servers or on the hard drives of client and stand-alone machines. There is a growing tendency or practice and, in many cases, need, to save e-mail messages electronically and to retrieve them easily when desired. For example, this can be important in any type of research setting where messages containing ideas, comments, or analysis are sent among researchers, possibly in different countries, over a period of several years. For example, it is foreseeable that a certain message sent at a particular time two years ago between two researchers who are no longer available, has to be retrieved. Of course, this capability could also be an important and useful feature in a business environment or in other settings.

The proliferation of e-mail and the increasing number of messages being saved, coupled with the growing demand for retrieving saved messages has exposed problems with current indexing schemes and message storage areas (message stores). There is a growing trend to save messages on servers instead of on client machines. A mail server acts as a central repository of messages and has the advantage of being backed-up regularly, maintained by an administrator, and of being repaired quickly (in most cases) when broken (e.g. when it crashes). Thus, when a user makes a request, it is handled by the server and delivered to the client.

The composition of an e-mail message today can vary widely as can the type of request. In a simple case, an e-mail message can contain, in addition to required headers, a simple message portion consisting of a few lines of text. On the other hand, an e-mail can have several attachments that may include complex graphics, audio segments, video, animation, text having special encoding (e.g. if in a non-Latin based language), and even other entire e-mail messages.

Requests for messages can also vary in terms of depth and breadth of information desired. For example, a request can be for the entire content of a single message sent several years ago between two individuals. Or, a request can be for a list of recipients of any message sent regarding a particular subject in the last 24 hours, the list distinguishing those recipients who have opened the message(s) and those who have not. In sum, the nature of e-mail messages and of requests for e-mail message data have grown more complex thereby exposing weaknesses of present mail servers in handling message storage and retrieval.

Most mail servers presently used for the type of message storage and retrieval discussed above are configured according to the Internet Message Access Protocol, or IMAP. The IMAP protocol is a collection of commands for manipulating messages and indexes for sorting and storing all the information associated with messages and actions performed on them. In order for an IMAP-configured server to take full advantage of the IMAP protocol, information related to users on the network and messages, which includes message content and meta data regarding the message, must be stored in a manner that takes advantage of IMAP indexing. While IMAP servers store data according to IMAP indexing to some degree, none do it in such a manner that optimizes quick, reliable, and non-contentious retrieval and storage of data.

Present IMAP servers experience contention problems and other inefficiencies resulting in poor performance. Although they handle message data as a collection of fields that make up a record, i.e., they are record-based, writing a new message to a user's inbox will very likely result in locking out the user from performing other operations in the inbox. The message store of these IMAP servers were not designed to efficiently utilize the indexing available in IMAP. For example, a user may only desire information regarding certain fields (e.g. date, recipients, subjects, etc.) from all messages in a mailbox. IMAP servers are likely to retrieve more information than is needed to satisfy typical user requests for data. Thus, in order to simply get the number of messages sent to a particular user regarding a specific subject, an IMAP server may read from disk the entire content of all the messages in order to derive the number of messages. Present IMAP servers also lack strong integrity and consistency checking capabilities possible in IMAP.

Others mail protocols and operating systems require that an entire message be read or copied regardless of what type of information regarding the message is being requested. For example, servers configured based on the Post Office Protocol (POP) deliver the entire message in its operations. This is similar to VARMAIL, an older file-based mail environment in the UNIX operating system, in which delivery of a message locked out all write operations to a mail folder. This default procedure caused the mail delivery system to be considerably slow. In addition, the VARMAIL environment also required multiple copies of the same e-mail message be stored in the client machine's memory.

Therefore, what is needed is a method of accessing and manipulating mail messages in a server-based message store that minimizes locking contention and, by taking advantage of the organization of the message store, provides high speed access to mail messages. The methods should take advantage of the high level of indexing and message data provided in the message store to allow for memory-efficient, high-speed retrieval and manipulation of messages in a high-end user, high-volume, distributed computing environment.

SUMMARY OF THE INVENTION

To achieve the foregoing, and in accordance with the purpose of the present invention, methods, apparatus, and computer readable medium for accessing data in a message store are provided. In accordance with one aspect of the present invention, a method of accessing data in a message store in a multi-threaded system is disclosed. The system determines whether a process is available for accepting a new connection and responsibility for that connection is transferred to that process, which includes one or more threads. One thread is selected and initialized, and then manages client requests for accessing messages or data in the message store. The thread is terminated when a termination request is received or when a predetermined condition has been met.

In one embodiment of the present invention, a client connection is established by receiving a request from a client request queue. A process is selected is informed of the connection and retrieves information regarding the connection from a shared memory accessible by the selected process and other processes in the system. In yet another embodiment, a selected thread is initialized by allocating a cell in a shared memory for storing a process and thread identifier and associating the thread with an input polling thereby placing the thread in a wait state. In yet another embodiment, the selected process is alerted of the incoming data by an input polling thread and the incoming data is routed to the process and a thread within the process. In yet another embodiment, critical signals directed to a connection thread in the selected process is handled by a critical signal thread. The critical signal thread prevents the entire selected process from terminating (and all the connection threads within such process from abruptly ending) and shuts down in an orderly fashion only the connection thread that caused the critical signals.

In another aspect of the invention, a method of duplicating a message in a message store is disclosed. A reference counter in the message store associated with the message is updated to indicate that an additional user folder is referencing the message. Access to a destination user folder storing the message is limited while a duplicate user folder cell associated with the message is appended to a destination user folder, wherein the user folder cell contains information on the message but does not contain the actual contents of the message. In yet another aspect of the invention, it is determined whether there are other locks on the destination user folder before closing the folder. In yet another aspect of the invention, access to an index directory cell corresponding to the message is temporarily restricted while the reference counter is being updated.

In yet another aspect of the invention, a method of accessing a specific portion of a message contained in the message store including user folders, index folders, and data buckets is disclosed. A mail folder cell associated with the message is examined to obtain the location of a corresponding index folder cell. The index folder cell is then examined to obtain information needed to locate a specific section of the message, the message being contained in a data bucket. The specific section of the message is then retrieved. In another embodiment, the date the message was written to the mail folder cell is used to identify an index directory and an index file. An index directory cell is used to locate an index file cell associated with the message where the index file cell contains information leading to the specific section of the message being sought.

In another aspect of the invention, a computer system for accessing messages in a message store is disclosed. Client requests for connecting to a message store received and routed by a request router. The request router is connected to one or more multi-threaded request handlers, each handler having one or more connection threads. Associated with the request router is a shared memory containing request handler identifiers and connection thread identifiers. The shared memory is accessible by all the request handlers connected to the request router.

In one embodiment, the request router includes a request handler generator capable of creating new request handlers when it is determined that there are no request handlers available to maintain new connection threads. In yet another embodiment, the request router manages one or more of the request handlers connected to it. In yet another embodiment, each request handler includes an input polling thread for detecting an input event directed to an active connection thread in the request handler. In yet another embodiment, each request handler includes a critical signal thread for detecting critical signals directed to a particular active connection thread in the request handler. The critical signal thread terminates only the particular active connection thread that caused the critical signal and thereby keeps other active connection threads in the request handler functioning. In yet another embodiment, the shared memory allocated by the request router includes thread specific data cells associated with connection threads that contain request handler identifiers and connection thread identifiers

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Figure 1:
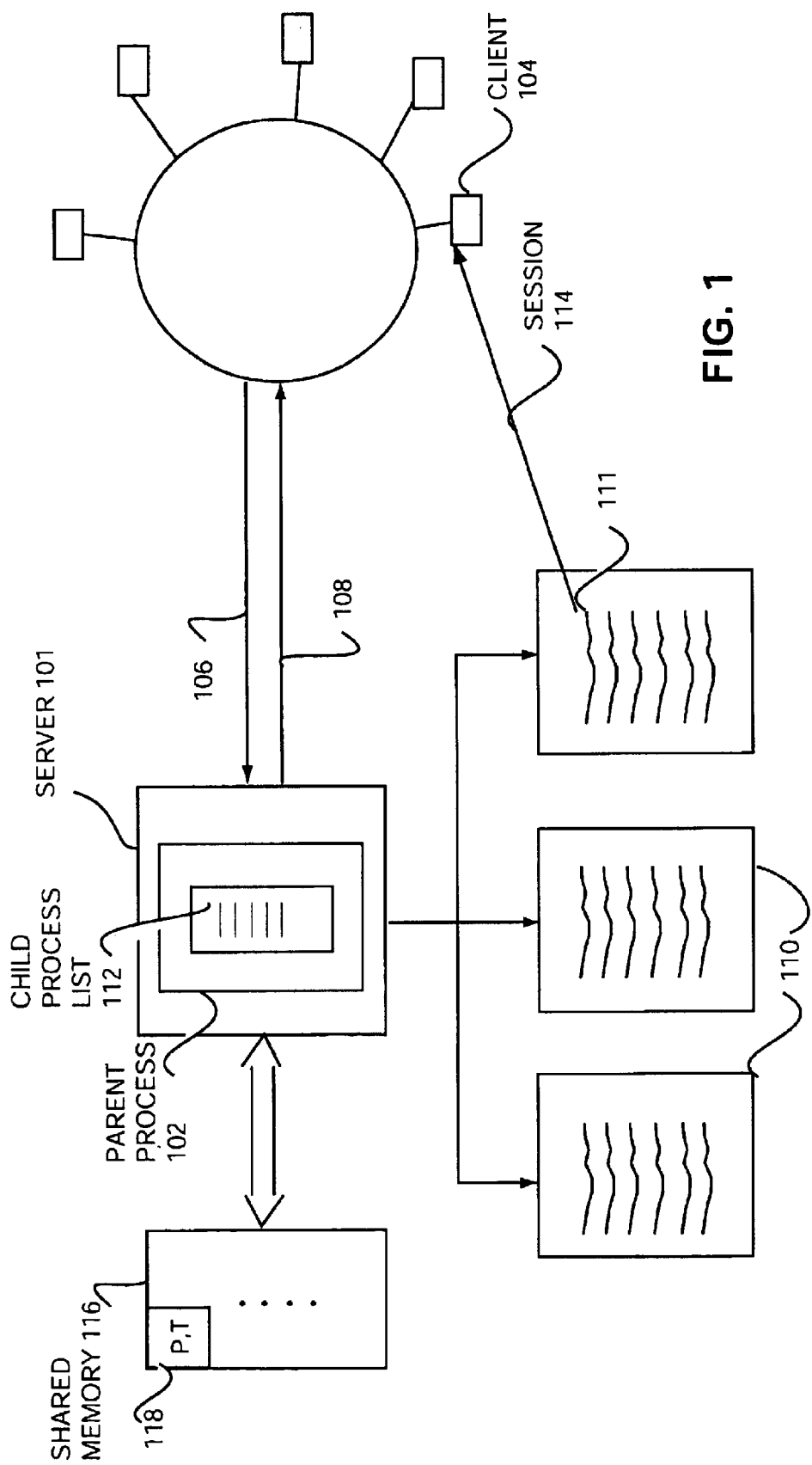
FIG. 1 is a block diagram showing various components of message access configuration and method in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

An improved method of accessing and manipulating data in a message store that minimizes contention in folders and takes advantage of indexing and other referential data is illustrated in the various drawings. In the described embodiment, the method recited uses section locking to protect only required portions of folders when manipulating message data in a message store. The methods also make use of counters, record sizes and offsets, and reference pointers to quickly locate, duplicate, or otherwise manipulate message data in a message store. As discussed above, and with regard to the described embodiment, it is desirable to store and index e-mail messages on a server where the server is responsive to client requests for data regarding that client's messages. It will be appreciated that two such protocols are the Internet message Access Protocol (IMAP) and the Post Office Protocol (POP). In accordance with the described embodiment, the server can be configured to manage and store messages of most commonly used mail protocols. In the described embodiment, the server is configured to primarily respond to IMAP commands and messages but can also process and store messages based on POP or other mail protocols. With regard to the described embodiment, it should be noted that while IMAP servers presently have some degree of indexing, the overall configuration of the message store and level of indexing is unable to efficiently process increasingly complicated and demanding user requests for data.

Thus, only by way of example, the server in the described embodiment is an IMAP configured server that stores Internet e-mail, typically for many thousands of users. Accordingly, it is useful to briefly explain the structure of an Internet e-mail message used in the described embodiment. As is well-known to a person of ordinary skill in the art, an Internet e-mail message is formatted according to MIME. A MIME message consists of a MIME header and one or more body parts or sections, each body part having a header. The MIME format allows an e-mail message to contain various types of media such as audio, video images, non-English text, HTML, and so on. A message store of the described embodiment accommodates MIME sections through various indexes which are discussed below. A message access method of the present invention allows for efficient handling of highly specific requests. By way of example, it allows retrieval of specific MIME sections of a specific message without retrieving the entire message.

FIG. 1 is a block diagram showing various components of a message access configuration and method in accordance with one embodiment of the present invention. In the described embodiment, the messages stored and accessed are Internet e-mail messages. An Internet message (IM) access daemon 100 resides on a network mail server, such as an IMAP server which may also contain a message store. An example of an IMAP message store used to store messages and index information which may be used with the present invention is described in co-pending MESSAGE STORE application, the entire specification of which is incorporated herein by reference. A parent process 102 within daemon 100 is responsive to data (typically commands or requests to connect) sent from clients 104. Requests to connect 106 from clients are stored in a queue and are received by the server at a port depending on the protocol in which the request is being made. For example, port number 143 is reserved for IMAP commands and port 110 is reserved for POP commands. These protocols are described in greater detail below and in copending MESSAGE STORE application. It will be appreciated by a person of ordinary skill in the art, that a mail transfer agent (MTA) resides on the server (not shown in FIG. 1) and listens for requests from clients. Once the server responds to a request 106, a connection 108 with a client is established and the client can begin sending data, such as commands for accessing and manipulating mail.

The parent process 102 has control of several concurrently operating child processes 110. It maintains a list of child processes 112 under its control. Each child process 110 has several threads of various types that can be in one of several states. In the described embodiment, there are 50 to 200 threads in each child process. The number of threads can be determined empirically and depends on the specific platform on which the system is running. Once a connection is established between a client and a server, a session is established between a thread and that client, shown at line 114.

In the described embodiment, a child process, a thread, and a connection associated with that thread each have a number or identifier. This information is stored in a shared memory, having a series of data cells, that can be read and updated by all child processes. The shared memory is useful because typically child processes are not aware of each other's existence and cannot communicate. In other preferred embodiments, a shared memory may not be needed if child processes are able to communicate directly. A thread in a particular child process may cause contention when trying to open a mailbox if another thread in another child process is writing to that mailbox. In the described embodiment, as soon as a child process is created, shared memory cells associated with that child process are allocated by the parent process.

Once a thread is created within a child process, a thread-specific data cell is assigned to that thread. In the described embodiment, this shared memory is created and pre-allocated by the parent process when the server is activated.

In other preferred embodiments, the shared memory, if needed, can be created by other entities in the operating system. The size of the shared memory is based on the maximum number of processes and threads the parent process can manage and will vary on different platforms. As mentioned, the shared memory is made up of a series of data cells. These cells are identified by a coordinate "i" corresponding to a process and a coordinate "j" corresponding to a thread within that process. Thus, cell ($P_i,T_j$) is a thread specific data cell, which also contains a derived mailbox index "k," that allows one thread to inform other threads of its actions, such as updating a mailbox or copying messages from a mailbox. The thread specific data cells of the described embodiments in shared memory allow a thread to inform all other threads under the same parent process of that thread's actions. The purpose of these cells, primarily with regard to locking contention, is discussed in greater detail below. Thus, the shared memory resides on the server and is pre-allocated and controlled by a parent process once the parent process is invoked. In the described embodiment, a thread specific data cell also contains a user's name, a login or connection time, and the mail protocol being used, e.g. IMAP or POP.

Figure 2:
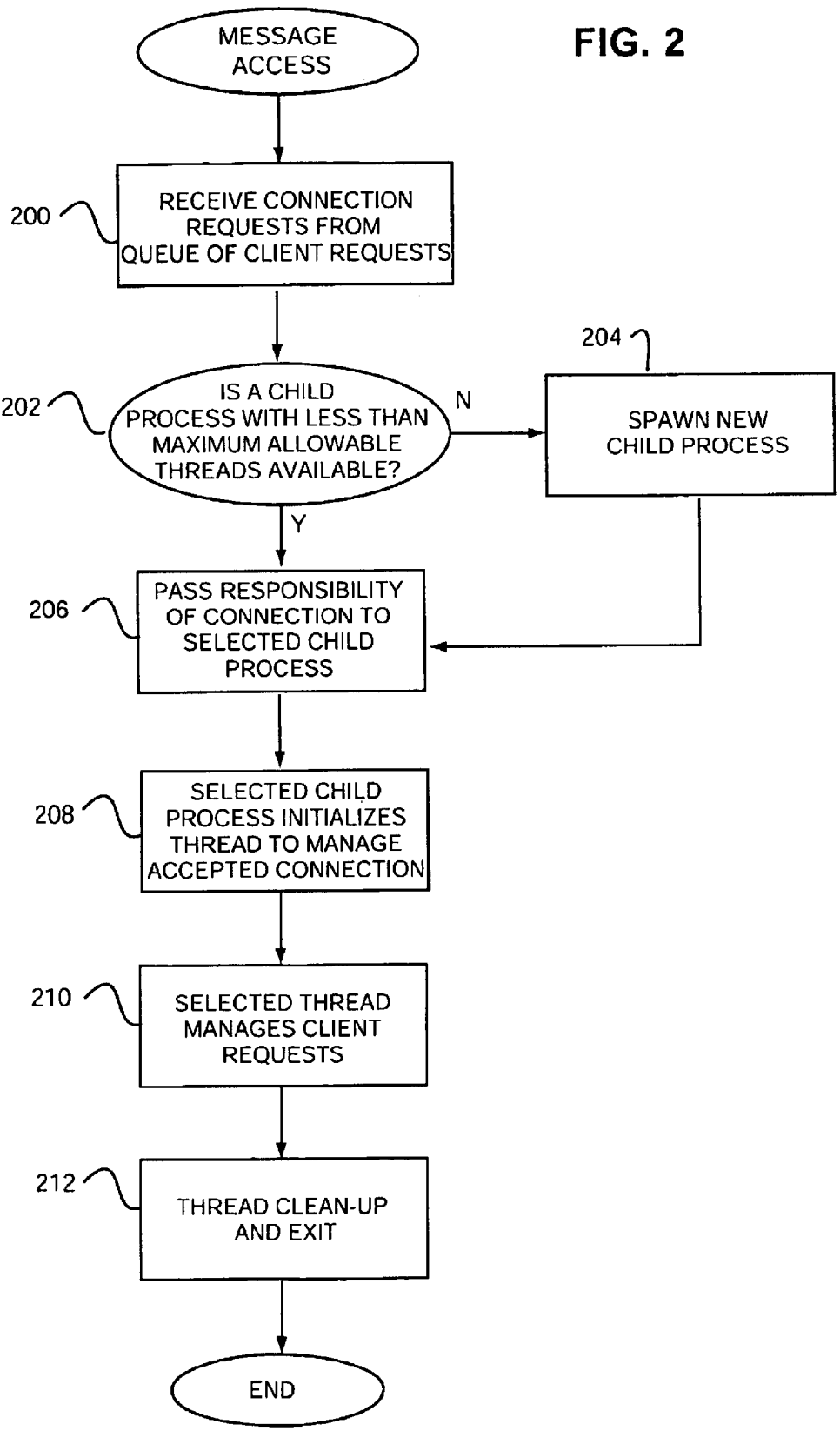
FIG. 2 is a flowchart describing an overview of a message access method in accordance with one embodiment of the present invention.

FIG. 2 is a flowchart describing an overview of a message access method in accordance with one embodiment of the present invention. As mentioned above, a message access method of the present invention is a method used in conjunction with a message store to reduce locking contention among users accepting and manipulating mail data on a network. At step 200 the server receives a connection request from a queue of requests from clients on a network. In another preferred embodiment, the message access method of the present invention can be used by a stand-alone user accessing a message store. A client must first make a request to connect to the server to establish a connection which, in turn, creates a session between a thread and the client. The connection request is received by the server at a port determined by the mail protocol being used by the client. At step 202 the system determines whether there is a child process with less than the maximum number of allowable threads. As mentioned above, the maximum number of threads in a child process can be determined based on performance on a specific platform. By way of example, in a high-volume distributed environment, the number is in the range of 50 to 200 threads. This is done by checking the list of child process contained in the parent process. If all existing child processes have the maximum number of threads, the parent process spawns a new child process as shown in step 204. At this stage in the described embodiment, the parent process also allocates a predetermined amount of space in shared memory for the child process. In the described embodiment, a parent process uses a semaphore in the shared memory to block further activity between the parent process and client requests until the child process is created and a connection is established, at which point the parent process can resume processing client requests. This is desirable to ensure that the new child process has been properly created and can accept new connections. Once a new child process is created, the parent process passes responsibility of the connection to the selected child process at step 206. If there is a child process available at step 202, the parent process will pass responsibility of the connection to the child process having the minimum number of threads at step 206. In other preferred embodiments, a parent process can use other criteria for choosing an appropriate child process.

At step 208 a selected child process initializes a thread for managing the accepted connection. The accepted connection is managed based on the protocol being used by the client, e.g. IMAP or POP. In the described embodiment, each child process has an initialization thread to initialize new active connection threads. In other preferred embodiments, new active connection threads can be initialized outside the child process. At step 210 the selected child process and thread manage the client request. Examples of a thread managing a client request such as copying a message or retrieving a message, are discussed in detail below. At this stage, a master-slave relationship is created between the newly created thread (slave) for the client (master). When the client terminates the connection or times-out from being idle for a predetermined time, the parent process begins thread clean-up at step 212. At thread clean-up and exit, all resources associated with the thread are made available for other threads. After thread clean-up, the message access procedure for a client is complete.

Figure 3:
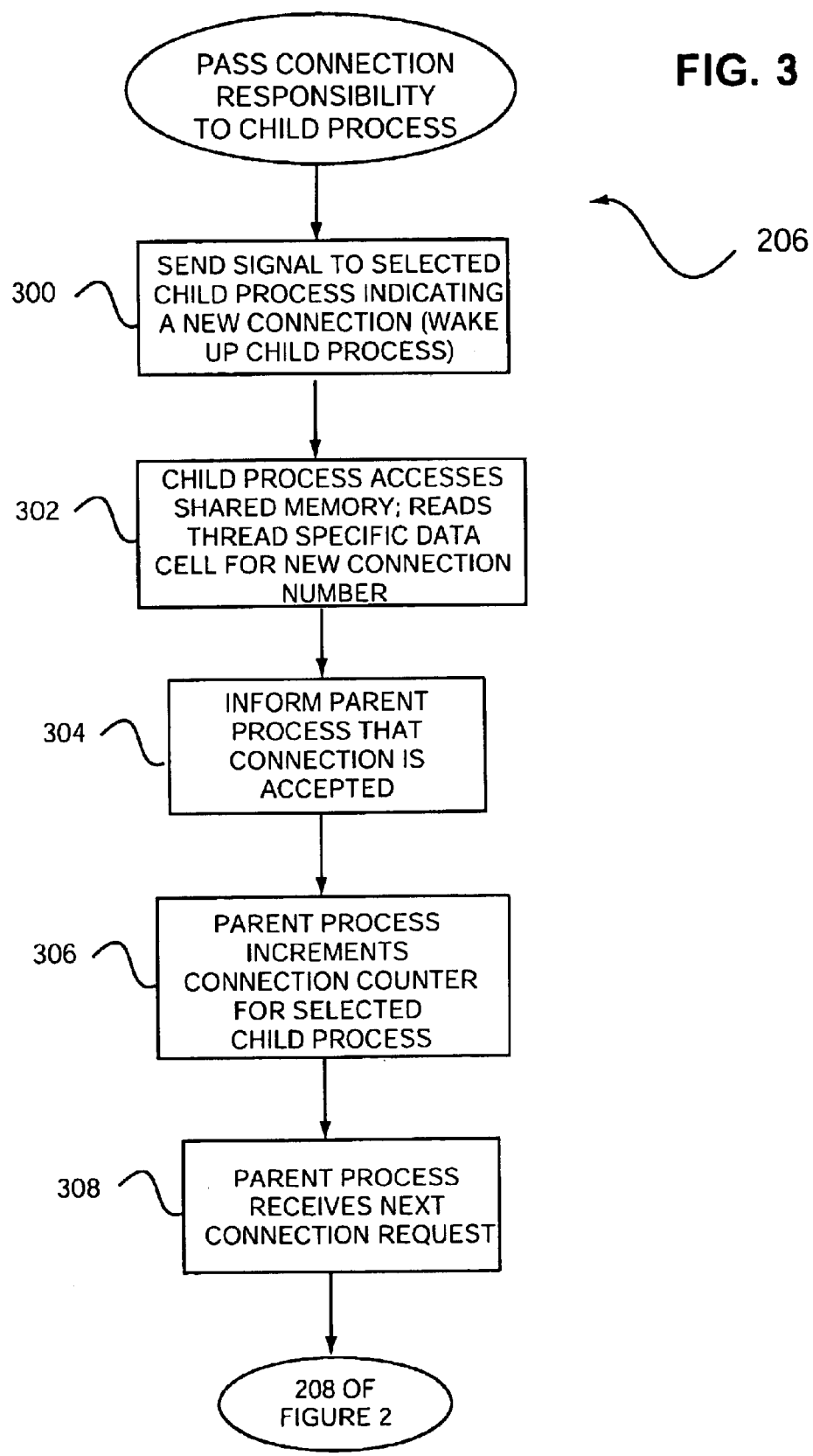
FIG. 3 is a flowchart showing in greater detail the step of passing connection responsibility to a child process as shown in step 206 of FIG. 2.

FIG. 3 is a flowchart showing in greater detail the step of passing a connection responsibility to a child process as shown in step 206 of FIG. 2. At step 300 a parent process sends a signal to a selected child process indicating that there is a new connection, identified by a connection member, to be managed by the child process. In other preferred embodiments, a semaphore may be used instead of a signal. The child process may be in a SLEEP state in which case the signal would be waking up the selected child process. At step 302 the child process accesses the shared memory described in FIG. 1b. The child process reads a thread-specific data cell for the new connection number. The thread-specific data cell also indicates whether the command is in POP or IMAP or some other mail protocol. At step 304 the parent process is informed that the new connection has been accepted by the child process and can at that point accept new requests for manipulating and retrieving mail. At step 306 the parent process increments the connection counter for the selected child process. Once the parent process increments the connection or thread counter for the selected child process, it waits on a system call until it receives the next connection request. The process then continues with step 208 of FIG. 2 where the selected child process initializes a thread to manage the accepted connection.

Figure 4:
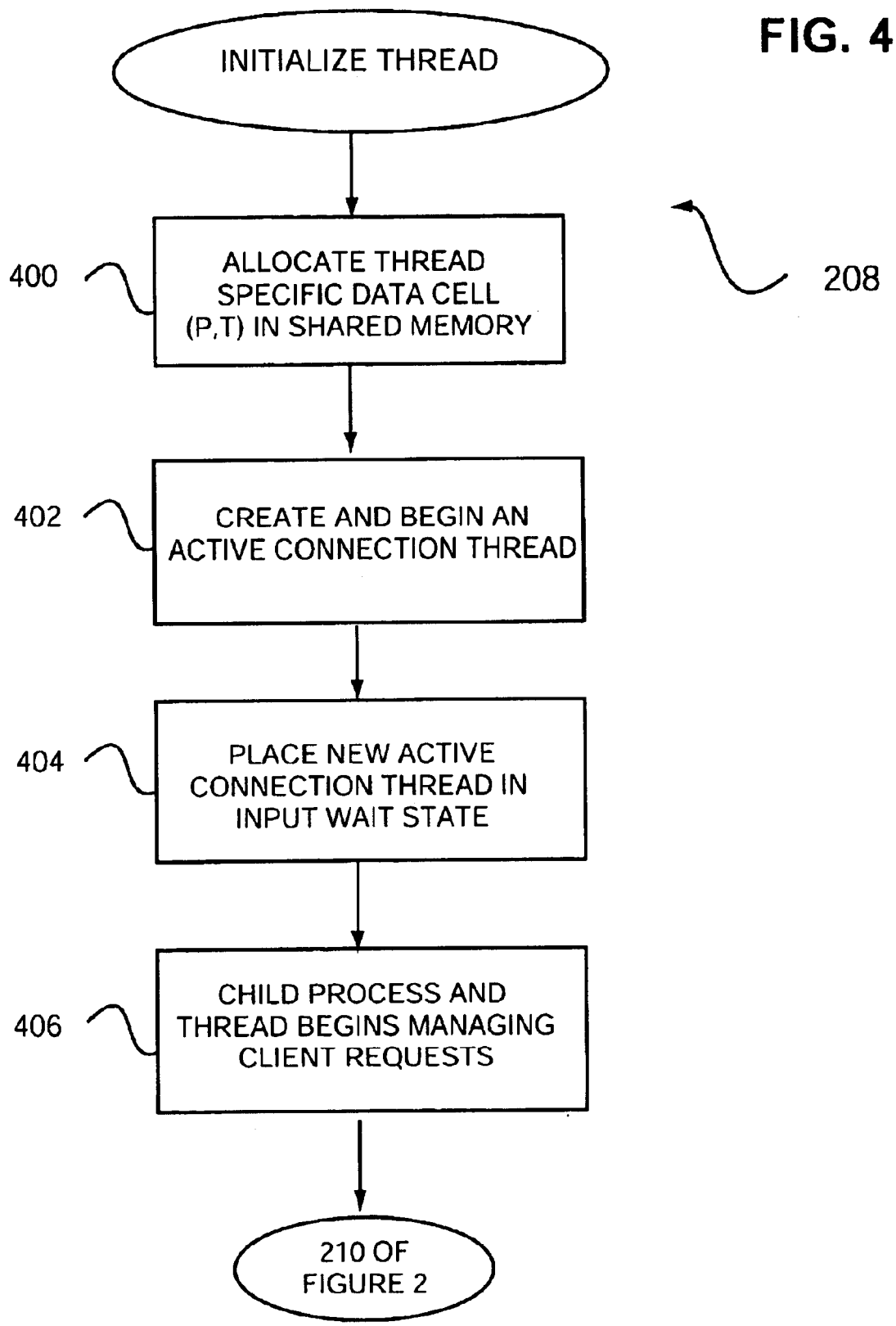
FIG. 4 is a flowchart showing in greater detail the step of initializing a thread as shown in step 208 of FIG. 2.

FIG. 4 is a flowchart showing in greater detail the step of initializing a thread as shown in step 208 of FIG. 2. At step 400 the system allocates a thread-specific data cell in the shared memory. The thread-specific data cell has the coordinates $P_i$ and $T_j$, where P represents a process number and T represents a thread number. These coordinates or numbers are used to manage the thread in a global context. In the described embodiment the thread-specific data cell also contains a connection number. At step 402 the system will create and execute an active connection thread in the selected child process. The active connection thread is protocol specific, i.e. IMAP or POP-oriented, as determined by the port address where the command was received. In the described embodiment, the new active connection thread is placed into a wait state at step 404 where it waits for an input event to occur, such as a user request or system interrupt. The active connection thread is in an input wait state where it will either receive a request or it will idle time-out. At step 406 the child process and the newly created thread begin managing client requests for accessing or reading data in a message store. The process then continues with step 210 of FIG. 2 where the active connection thread manages client requests.

Figure 5:
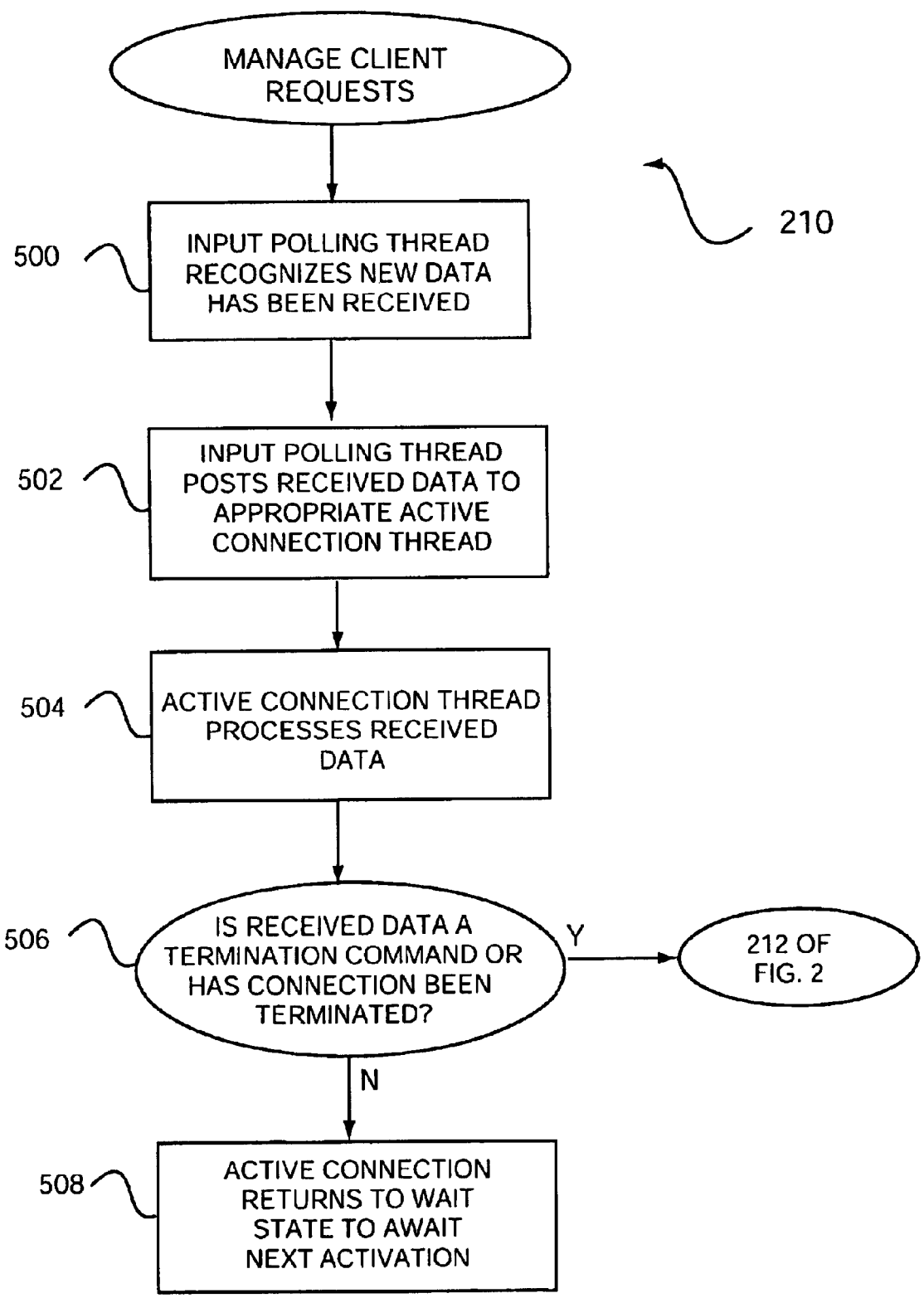
FIG. 5 is a flowchart showing in greater detail the step of a selected child process and thread managing client requests as shown in step 210 of FIG. 2.

FIG. 5 is a flowchart showing in greater detail the step of a selected child process and thread managing client requests as shown in step 210 of FIG. 2. In the described embodiment, an input polling thread of the child process is alerted that new data has been received by the parent process as shown in step 500. In the described embodiment, the input polling thread is implemented by one light weight process from a pool of light weight processes in the operating system. In other preferred embodiments, the child process may not use a separate thread to monitor input. For example, each connection thread can be responsible for waiting for input data directly. The new data is likely to be a new IMAP or POP command. The new data can be in one of three states: 1) a new command (the client thread processes the new command); 2) an idle time out (the thread continues with the client command but informs the client of the idle time out condition); and 3) an unexpected termination connection (the connection is unexpectedly broken; the child process continues processing the client command but lets the client know that the connection has been broken). In step 502 the input polling thread posts the newly received data to the active connection thread. The active connection thread is in a wait state and is woken up once it is informed that it has received data by an input polling thread. At step 504 the active connection thread processes the received data, typically a command. This is described in greater detail in FIG. 6. The technique of using an input polling thread to receive new data from the parent process minimizes the use of light weight processes in the operating system which are a limited quantity. However, as stated above, in other preferred embodiments, the child process may not use a separate thread, such as an input polling thread to monitor incoming data. Each active connection thread can have its own light weight process to detect incoming data. As mentioned above, in the described embodiment, only a single light weight process is needed to implement the polling thread. A polling thread monitors any incoming data and posts the data to the appropriate active connection thread. The input polling thread reduces the need for each active connection thread to have its own light weight process in order to monitor incoming data and determine whether the data is for a particular connection thread.

At step 506 the system determines whether the received data is a termination command or whether the connection has been terminated in any other way. A termination command can be, for example, a logout or quit command. If the data is a termination command or the connection has been terminated, control goes to step 212 of FIG. 2 where the system performs a thread clean up and exit. If the received data is not a termination command, the system returns to a wait state to await the next activation as shown in step 508.

Another way a connection can be terminated is by a dedicated, special thread referred to as a critical signal thread which detects critical signals sent by the operating system to a process containing the active connection that caused the critical signal. In the described embodiment, a critical signal is caused by a connection thread attempting an illegal memory access or an illegal instruction. For example, the code in the thread may attempt an illegal instruction (e.g. dividing a value by zero) or access a memory address that does not exist. The critical signal thread receives the signal sent from the operating system when a critical condition has occurred (the operating system is informed directly by the hardware), and terminates in an orderly fashion the connection thread that caused the critical signal. The critical signal thread prevents the undesirable reaction to a critical signal of terminating the entire process and all the connection threads within the process whenever one of the threads causes a critical signal. In the described embodiment, the context of each connection thread is sufficiently insulated or firewalled from other connections in the process, that the non-offending threads can continue operating without fear of having any of their resources or data corrupted by the offending or crashing thread. Thus, the critical signal thread unlocks and closes all files, closes all connections, and clears the shared memory of the connection of any connection thread that crashes without bringing down the entire process.

Figure 6:
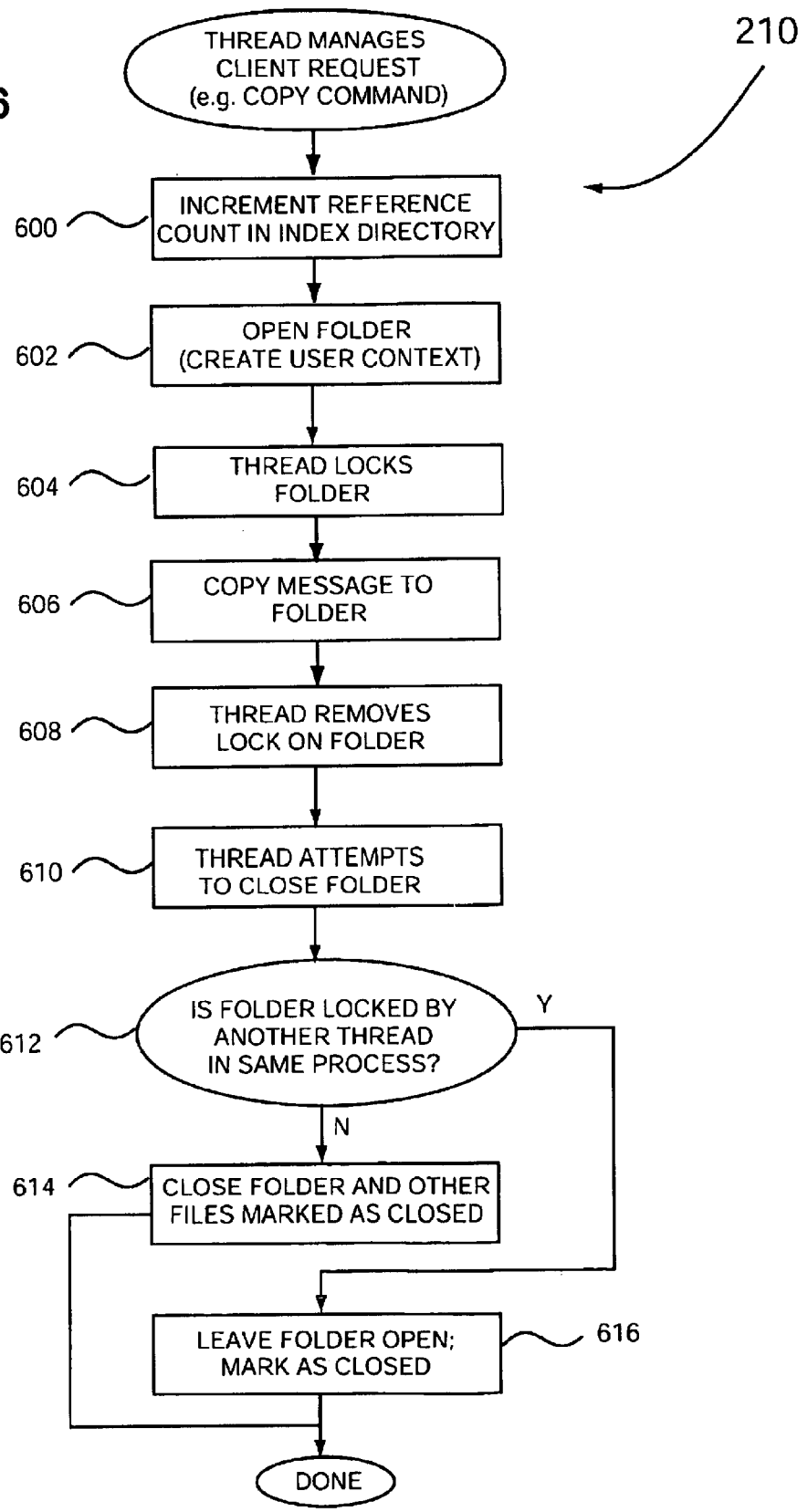
FIG. 6 is a flowchart showing how an active connection thread manages a typical COPY command from a client in accordance with one embodiment of the present invention.

FIG. 6 is a flowchart showing how an active connection thread manages a typical COPY command from a client in accordance with one embodiment of the present invention. It is an example of how a selected child process and active connection thread manage client requests as shown at step 210 of FIG. 2. The client request described in FIG. 6 is an IMAP COPY command. The COPY command is an example from a variety of commands such as DELETE, READ, MOVE, among others. In the copy command, a client (Cl) wants to COPY a message (m) from an inbox folder to a folder (or mailbox) f. In way of background, in addition to an inbox, which receives and holds new incoming messages, a user can create custom folders for holding messages on a particular topic. In order for the COPY command to be valid, the message and folder f must actually exist. The client has a connection (cnl) to f; therefore, f has been selected and is active (i.e. it has an associated thread t). Since the client wants to COPY a message from an inbox, it also has the inbox selected and open. Another client (C2) has also selected and opened the same folder f and may be actively using the folder. C1 sends an IMAP COPY command to the server to COPY message m from the inbox to folder f. In the described embodiment, when a message is copied, the system will append the message reference to the end of folder f and update appropriate counters in the message store as described in co-pending MESSAGE STORE application. As will be shown in greater detail below, by using the structure of the message store and thread locking mechanisms in the described embodiment, a COPY command only requires approximately 50 bytes of data be duplicated in the system, regardless of the length of the message. In other preferred embodiments, although the number of bytes duplicated may vary, the contents of the entire message may have to be copied.

Folder f is open and has two active connection threads from the same child process. One of the connections cnl, from Cl, and is in a wait state. The connection cnl is woken up by the COPY command. When f is selected, it creates a user context for the folder which includes a file descriptor or operating system identifier i for f. At step 600 the system increments a reference count (item 206 in MESSAGE STORE application) in an index directory cell (item 116 in MESSAGE STORE application) associated with m to reflect that an additional folder f will be referencing m. The reference count and index directory cell, and other fields and cells referred to below, are described in detail in co-pending MESSAGE STORE application. This step is discussed in greater detail below with respect to FIG. 7. It will be appreciated that it is desirable to increase the reference count before the message is actually appended instead of after because in the event of an error or crash during the COPY procedure, it is always safer to have a reference count that is too high than too low.

At step 602 Cl opens f thereby creating a user context for f and an identifier or file descriptor 1, as described above. For the purpose of describing the COPY command, assume C2 has already selected and opened f. In the described embodiment, it should be noted that when a thread has selected and opened a folder, it does not imply that it can lock out other threads. That is, other threads without knowing that the folder is locked by another thread in the same child process can attempt to perform write operations on the folder. It should also be noted that when a thread closes a folder, all locks on that folder are lost, and the threads that had those locks are not informed that their locks have been lost. Another procedure addresses these features and are discussed in greater detail below.

At step 604 thread t locks f Folder f has a list of threads that have selected and opened it, i.e., a file descriptor list, and a counter for the number of locks on it (f). A file descriptor 1 is added to the list in step 602 when folder f is opened. A lock counter is incremented at step 604 when f is locked. At step 606 the system copies the message to folder f. A cell associated with message m is appended to a user folder for f. The user folder is described in greater detail in the co-pending MESSAGE STORE application. This step is discussed in greater detail with respect to FIG. 8. Once m is copied to f, thread t removes its lock on f at step 608. It should be noted that at this stage another thread in the same process can lock f immediately after t releases its lock. The thread then attempts to close f in step 610 but is not able to close the folder until the system determines whether f is locked by another thread in the same child process as shown in step 612. As mentioned above, if a thread closes a folder, all locks on the folder are lost. Thus, in the described embodiment, before closing the folder, the system checks for other locks on the folder by checking the lock counter associated with the folder. If there are remaining locks, the system marks f as "closed" by marking the appropriate file descriptors in the file descriptor list in step 616, but does not actually close the folder. This is part of the procedure for handling thread locks on folders. Thread t is not aware that the folder is not actually closed, but continues operation as though the folder is closed. Once the folder is closed from the perspective of thread t, the COPY command is completed. If there are no other locks on the folder (i.e., lock counter is zero), the child process closest and any other files marked as closed in step 614 using a procedure from the process library, at which stage the COPY is done.

Figure 7:
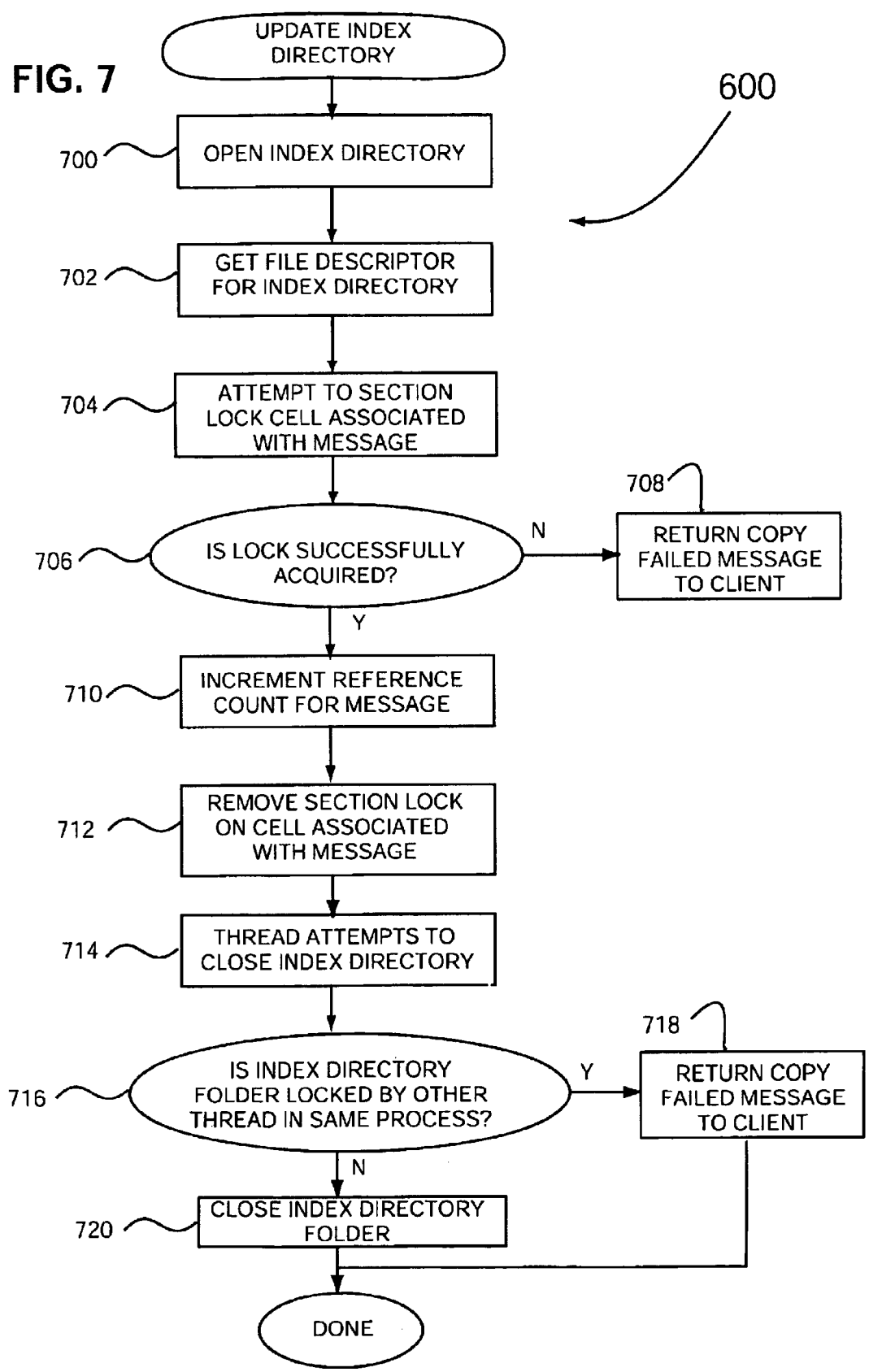
FIG. 7 is a flowchart showing in greater detail the step of incrementing the reference counter in an appropriate index directory cell as shown in step 600 of FIG. 6.

FIG. 7 is a flowchart showing in greater detail the step of incrementing a reference counter in an appropriate index as shown in step 600 of FIG. 6. At step 700 the system opens an index directory such as index directory 104 of FIG. 1 in the co-pending MESSAGE STORE application titled that contains the corresponding index directory cell (item 116 of FIG. 1). At step 702 the system retrieves a file descriptor associated with the index directory. At step 704 the system attempts to apply a section lock on the index directory cell associated with message m. Each message has an associated index directory cell which is the only portion of the index directory that needs to be locked in order to update the reference count (reference count field 206 of FIG. 2 in the co-pending MESSAGE STORE application) in the cell. At step 706 the system checks whether the section lock was successfully acquired since another thread may already have a lock on that cell. If the lock is unsuccessful, indicated, for example, by an idle time-out flag, an error message indicating that the COPY failed is returned to the client at step 708. If the lock is successfully acquired, the system increments the reference count in the index directory cell associated with message m. Once the reference count is incremented, the system removes the section lock on the index directory cell acquired at step 704. In order to remove the section lock on the cell, the system needs to have the offset and number of bytes of cell. Multiple cells in the index directory can be section locked in parallel, thus, reducing the locking contentions when incrementing the reference count.

The remaining steps in the process are similar to steps 610 to 616 of FIG. 6 except that the operations involve the index directory folder instead of folder f. Thus, at step 714 thread t attempts to close the index directory folder. At step 716 the system determines whether the index directory folder is locked by another thread in the same process. If it is, the child process marks the index directory folder as closed at step 718 but does not actually close the folder until it is safe to do so at a later time. As with folder f, thread t continues operation as if the index directory folder was closed. If there are no other locks on the folder by other threads, the child process closes the index directory folder in step 720. Once the index directory folder is either closed or marked as closed, the COPY command process continues with step 602 of FIG. 6 in which the folder f is opened.

Figure 8:
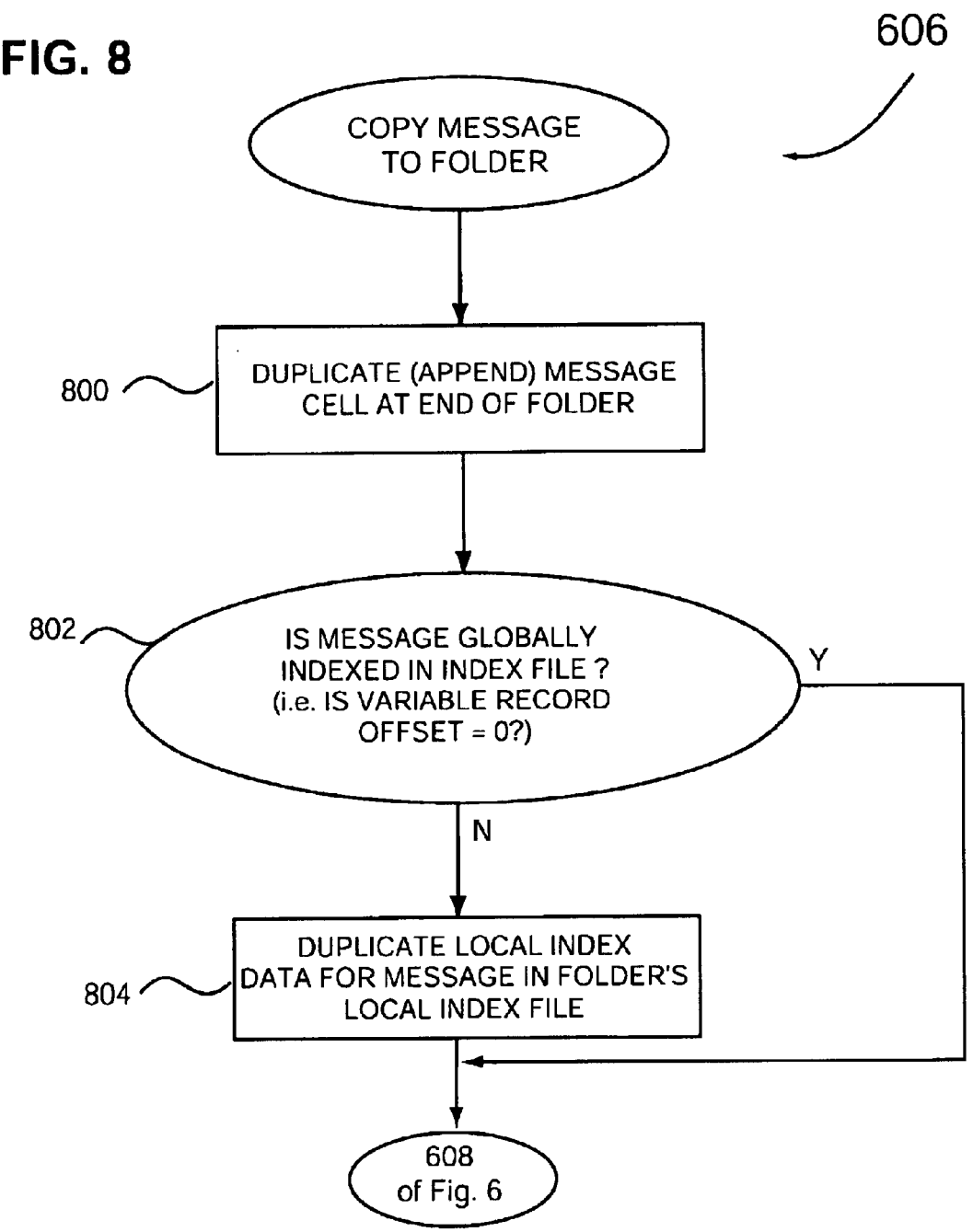
FIG. 8 is a flowchart showing in greater detail the step of copying a message to a destination folder as shown in step 606 of FIG. 6.

FIG. 8 is a flowchart showing in greater detail step 606 of FIG. 6 in which message m is copied to folder f. At step 700 the system duplicates a user folder cell, described in greater detail in FIGS. 1c and 6 in co-pending MESSAGE STORE application, corresponding to message m at the end of folder f. The cell contains data regarding a particular message and is contained in a user folder in a user folder directory, also shown in FIG. 1b of co-pending MESSAGE STORE application. In the described embodiment the cell is approximately 54 bytes long and has about 13 fields. In other preferred embodiments, the length and number of fields in a cell can vary. The process seeks the end of folder f and writes the 54-byte cell, already cached in memory, to the end of the folder. It will be appreciated that this a very fast write operation and does not involve having to duplicate or COPY the entire message m at any stage. At step 802 the process determines whether message m is indexed globally, as opposed to privately, in the index file. A message can be indexed globally if it is less than a certain size, for example, 256 kilobytes. If the message size is too large, it is indexed on the client machine and the index data is then placed on the mail server. Whether the message is globally indexed can be determined by examining the value of the offset of a variable index record, shown in field 620 in the user folder cell as described in FIGS. 1c and 6 in co-pending MESSAGE STORE application. If the variable index record offset is zero, message m is globally indexed. In this case, the process continues with step 608 of FIG. 6 where thread t removes its lock on folder f If the variable index record offset is not zero, the process duplicates the private index data for message m in folder f s private index file as shown in step 804. The process then continues with step 608 of FIG. 6.

Figure 9:
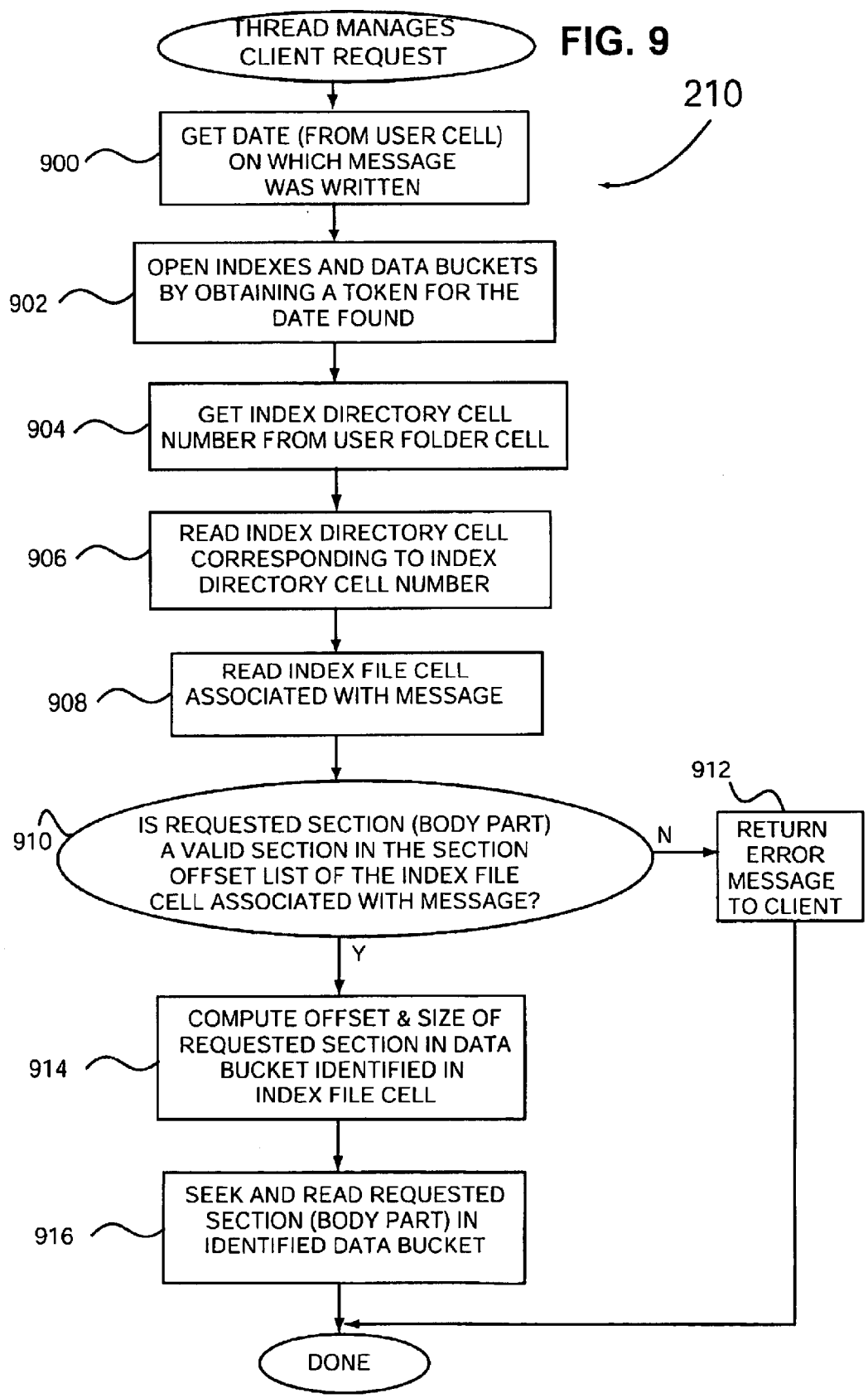
FIG. 9 is a flowchart of a method of accessing a specific portion of data in a message contained in a message store in accordance with one embodiment of the present invention.

FIG. 9 is a flowchart of a method of accessing a specific portion of data in a message contained in a message store in accordance with one embodiment of the present invention, and the MESSAGE STORE invention described in co-pending MESSAGE STORE application. Referring to the IMAP protocol used in the described embodiment, a FETCH command can be used for accessing data which is used to retrieve a particular body part (e.g., a MIME section) of a message. As will be appreciated by a person of ordinary skill in the art, Internet e-mail messages are normally structured based on a MIME format. The FETCH command is another example of a selected child process and thread managing a typical client request as described in step 210 of FIG. 2.

In step 900 the thread determines the day on which the message was written to the message store by reading an arrival time field 610 in user folder cell 130 corresponding to the message as described in co-pending MESSAGE STORE application. In step 902, the thread invokes a function to retrieve a token for the day the message was written to the store as determined in the previous step. The token allows the thread to open all the files needed to perform the FETCH command. In the described embodiment, the files first opened by the thread are the index files including the index directory and the index file. At a later point, the thread will open the appropriate data bucket, using a data bucket identifier described in co-pending MESSAGE STORE application for that day. The thread does not need to get a token to open these files for that particular day if they have already been opened.

At step 904 the thread obtains the index directory cell number 607 stored in a user folder cell 138 corresponding to the message as described in the copending MESSAGE STORE application. At step 906 the thread reads the index directory cell corresponding to the index directory number obtained in the previous step. In the described embodiment, the index directory cell contains an index file offset and an index file record size. In other preferred embodiments, the cell or record may contain a pointer or address directly referring to the corresponding index file cell. Based on this offset and record size, the thread reads the corresponding index file cell associated with the message as shown in step 908. The index file cell contains all the information now needed to access the particular body part sought in the FETCH command. As described in detail in co-pending MESSAGE STORE application, the index file cell included several items of information that can allow the thread to quickly determine the size and starting location, or offset, of various sections of a message stored in a data bucket. For example, the index file cell contains message envelope data and body data, message header size, data bucket identification, and a MIME section offset list which can be used to locate various sections of messages stored in a data bucket. In other preferred embodiments, other fields or pointers can be used to determine locations of various message sections.

As mentioned above, the FETCH command can be used to access a specific portion of a potentially long message. For example, a user may want to retrieve only a particular MIME section without the headers in the message, or may want to retrieve an attachment to the message only. Step 910 is a verification step in which the thread determines whether what was requested by the client is valid. If the FETCH command was for a specific MIME body part (i.e. section), the thread determines, in the described embodiment, whether the requested section is valid by checking a section offset list in the index file cell read in step 908. A section offset list contains a list of sections, section numbers, and their offsets. In other preferred embodiments, this information can be distributed in the index data without being grouped in a particular field or list. The thread checks whether the section number requested is in the list. If it is not, an error message is returned to the client at step 912. If the section requested is valid, the thread then computes the offset and size of the requested MIME section in the data bucket identified in the index file cell. The section offset list contains offsets of data from the beginning of the body data, as described in co-pending MESSAGE STORE application. In step 914 the thread computes the offset and size of the requested section in the data bucket using the header size, the number of bytes from the end of the header to the beginning of the section, the size of the section, and the size of the MIME headers necessary, if the client does not want to retrieve the MIME headers. In step 916 the thread seeks and reads the section in the identified data bucket. At this stage, the child process and thread have completed managing a FETCH command from the client.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 10:
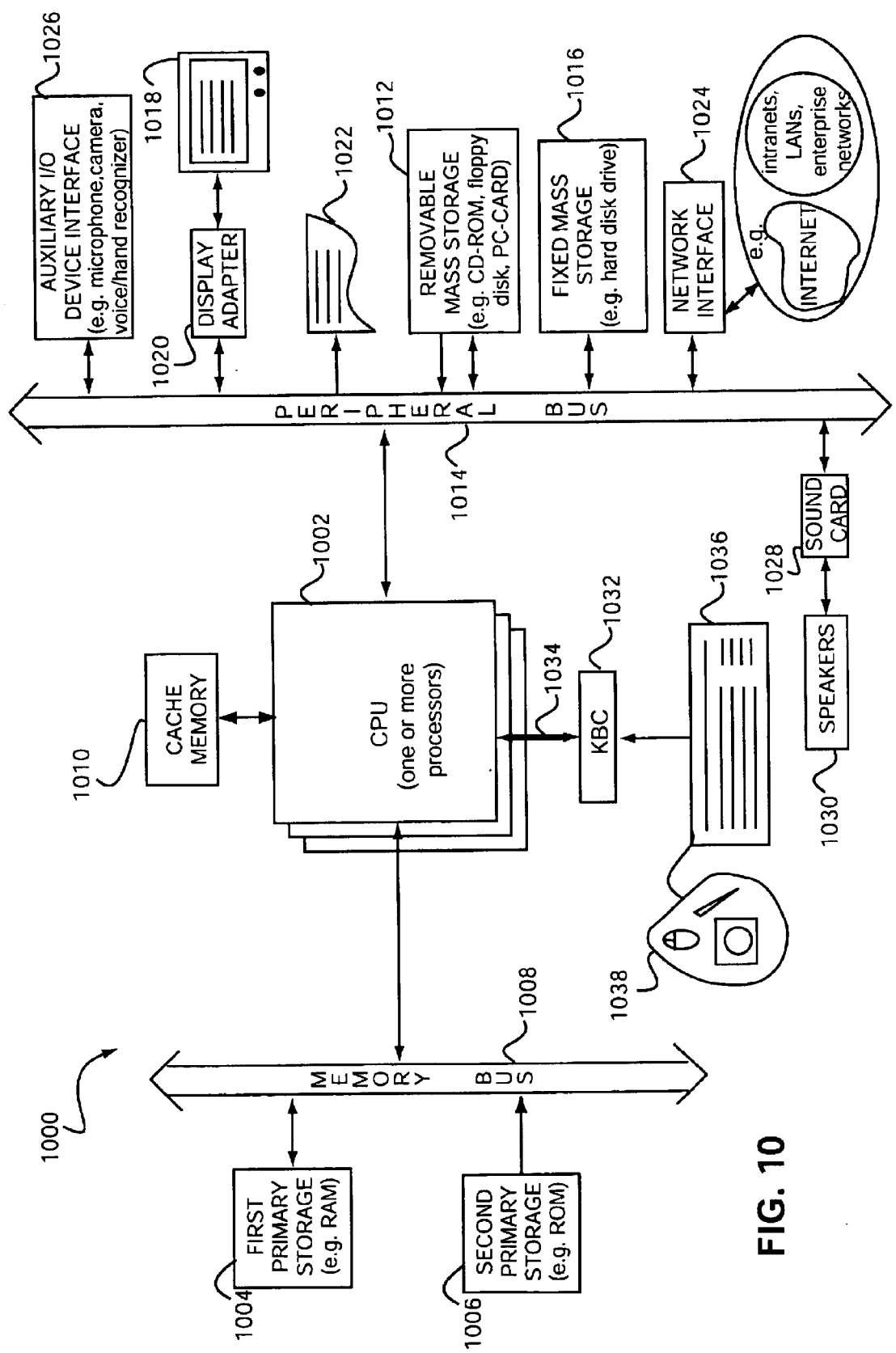
FIG. 10 is a block diagram of a typical computer system suitable for implementing the described embodiment of the present invention.

FIG. 10 is a block diagram of a general purpose computer system 1000 suitable for carrying out the processing in accordance with one embodiment of the present invention. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data. It can also store programming instructions and data, in the form of a message store in addition to other data and instructions for processes operating on CPU 1002, and is used typically used for fast transfer of data and instructions in a bi-directional manner over the memory bus 1008. Also as well known in the art, primary storage 1006 typically includes basic operating instructions, program code, data and objects used by the CPU 1002 to perform its functions. Primary storage devices 1004 and 1006 may include any suitable computer-readable storage media, described below, depending on whether, for example, data access needs to be bi-directional or uni-directional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, PC-CARDS, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as shown. Through the network interface 1024, it is contemplated that the CPU 1002 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For instance, the server can be configured to manage mail protocols other than IMAP or POP. In another example, connection threads in a selected child process may be responsible for detecting incoming data and may not use an input polling thread to monitor such data. In yet another example, the message access methods can access messages formatted according to standards other than the MIME standard. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of accessing electronic mail messages stored in a message store, the method comprising:

receiving a connection request at a request routing process;

determining whether a multi-threaded request handling process has an available connection thread for handling a connection corresponding to the connection request;

transferring responsibility for the connection request to a selected multi-threaded request handling process;

initializing a selected connection thread within the selected multi-threaded request handling process to manage the connection;

managing client requests for accessing the electronic mail messages stored within the message store using the selected connection thread;

running a critical signal thread in the selected multi-threaded request handling process; and terminating by the critical signal thread the selected connection thread when the selected connection thread caused the critical signal such that only the selected connection thread terminates and other connection threads in the selected multi-threaded request handling process remain functional.

2. A method as recited in claim 1 wherein receiving a connection request further includes reading a connection request queue.

3. A method as recited in claim 1 wherein determining whether a multi-threaded request handling process has an available connection thread further includes storing information regarding the selected connection thread and the selected request handling process in a shared memory accessible by other multi-threaded request handling processes.

4. A method as recited in claim 1 wherein determining whether a multi-threaded request handling process has an available connection thread further includes:

searching for the request handling process with less than a predetermined number of active connection threads by scanning a list of request handling processes contained in the request routing process; and creating a new request handling process if substantially all existing request handling processes contain a predetermined number of connection threads.

5. A method as recited in claim 1 wherein initializing a selected connection thread within the selected request handling process further includes:

allocating a cell corresponding to the selected connection thread in a shared memory for storing a request handler process identifier and a connection thread identifier.

6. A method as recited in claim 1 wherein initializing a selected connection thread within the selected request handling process further includes:

associating the selected connection thread with an input polling thread in the selected request handling process and placing the connection thread in a wait state.

7. A method as recited in claim 1 wherein managing client requests further includes:

alerting the selected request handling process of an incoming client request; and routing the incoming client request to the connection thread associated with the selected request handling process for processing.

8. A method as recited in claim 7 wherein alerting the selected request handling process of an incoming client request further includes running an input polling thread for detecting when the incoming client request is received by the selected request handling process.

9. A computer system for accessing electronic mail messages stored in a message store, the system comprising:

a request router suitable for accepting message store connection requests from a plurality of clients;

a plurality of multi-threaded request handlers associated with the request router, each one of the plurality of multi-threaded request handlers being suitable for maintaining a multiplicity of connection threads, each of the multiplicity of connection threads being adapted for managing client requests for accessing the electronic mail messages stored within the message store;

a shared memory associated with the request router, the shared memory including request handler identifiers and connection thread identifiers, the shared memory being accessible by the request handlers such that one such request handler can share activity information associated with the request handler with other request handlers, the activity information associated with the request handler indicating activity of the request handler; and wherein each one of the plurality of request handlers further includes a critical signal thread detecting one or more critical signals directed to a particular active connection thread within such request handler, wherein the critical signal thread terminates only the particular active connection thread that caused one of the detected critical signals, thereby keeping other active connection threads in the request handler functioning.

10. A computer system as recited in claim 9 wherein the request router further includes a request handler generator capable of creating new request handlers when it is determined that there are no request handlers available to maintain a new connection thread.

11. A computer system as recited in claim 9 further comprising a request queue scanner capable of accepting message store connection requests from a request queue connected to the request router.

12. A computer system as recited in claim 9 wherein the request router is arranged such that when a message store connection request is received, the request router determines whether any existing request handler can accept the connection request and if not, the request router creates a new request handler.

13. A computer system as recited in claim 9 wherein each request handler further includes an input polling thread detecting an input event directed to active connection threads within such request handler.

14. A computer system as recited in claim 9 wherein the shared memory allocated by the request router further includes a plurality of thread specific data cells containing the request handler identifiers and the connection thread identifiers wherein each one of the thread specific data cells is associated with a connection thread.

15. A computer system for accessing electronic mail messages stored in a message store, the system comprising:

means for accepting message store connection requests from a plurality of clients;

means for maintaining a multiplicity of connection threads; and a shared memory including one or more request handler identifiers identifying one or more request handlers and one or more connection thread identifiers identifying one or more connection threads, the shared memory being accessible by a plurality of request handlers such that one request handler in the plurality of request handlers can share activity information indicating activity of the one request handler with one or more other request handlers in the plurality of request handlers;

wherein each means for accepting message store connection requests further includes means for detecting critical signals directed to a particular active connection thread, wherein the critical signal thread terminates only the particular active connection thread that caused a detected critical signal, thereby keeping other active connection threads functioning.

16. A computer system as recited in claim 15 wherein means for accepting message store connection requests further includes means of creating new request handlers when it is determined that there are no request handlers available to maintain a new connection thread.

17. A computer system as recited in claim 15 wherein means for accepting message store connection requests further includes means for detecting an input event directed to active connection threads.

18. A computer system as recited in claim 15 wherein the shared memory further includes a plurality of thread specific data cells for containing the request handler identifiers and the connection thread identifiers wherein each one of the thread specific data cells is associated with a connection thread.

19. A computer-readable medium containing programming instructions for accessing electronic mail messages in a message store, the computer-readable medium comprising computer program code devices configured to cause a computer to execute the steps of:

receiving a connection request at a request routing process;

determining whether a multi-threaded request handling process has an available connection thread for handling a connection corresponding to the connection request;

transferring responsibility for the connection request to a selected multi-threaded request handling process;

initializing a selected connection thread within the selected multi-threaded request handling process to manage the connection;

managing client requests for accessing electronic mail messages stored within the message store wherein the selected connection thread is responsible for managing the client requests for accessing electronic mail messages; and terminating the selected connection thread when either a termination request is received or when a predetermined condition has been met;

wherein the computer program code devices configured to cause a computer to manage client requests further includes computer program code devices configured to cause a computer to execute the steps of running a critical signal thread in the selected request handling process for managing critical signals directed to an active connection thread in the selected request handling process such that only the active connection thread that caused a critical signal terminates and other connection threads in the selected request handling process remain functional.

20. A computer-readable medium as recited in claim 19 wherein the computer program code devices configured to cause a computer to determine whether a multi-threaded request handling process has an available connection thread further includes computer program code devices configured to cause a computer to execute the steps of:

determining whether a request handling process with less than a predetermined number of active connection threads exists by scanning a list of request handling processes contained in the request routing process; and creating a new request handling process if all existing request handling processes contain a predetermined number of connection threads.

21. A computer-readable medium as recited in claim 19 wherein the computer program code devices configured to cause a computer to initialize a selected connection thread within the selected request handling process further includes computer program code devices configured to cause a computer to execute the step of allocating a cell corresponding to the selected connection thread in a shared memory for storing a request handler process identifier and a connection thread identifier.

22. A computer-readable medium as recited in claim 19 wherein the computer program code devices configured to cause a computer to manage client requests further includes computer program code devices configured to cause a computer to execute the steps of:

alerting the selected request handling process of an incoming client request; and routing the incoming client request to the connection thread associated with the selected request handling process for processing.

23. A computer-readable medium as recited in claim 19 wherein the computer program code devices configured to cause a computer to alert the selected request handling process of an incoming client request further includes computer program code devices configured to cause a computer to execute the steps of running an input polling thread detecting when the incoming client request is received by the selected request handling process.

24. The method as recited in claim 1, wherein the client requests comprise at least one of a COPY command, DELETE command, READ command, MOVE command, and FETCH command.

* * * * *